Patented Nov. 7, 1922.

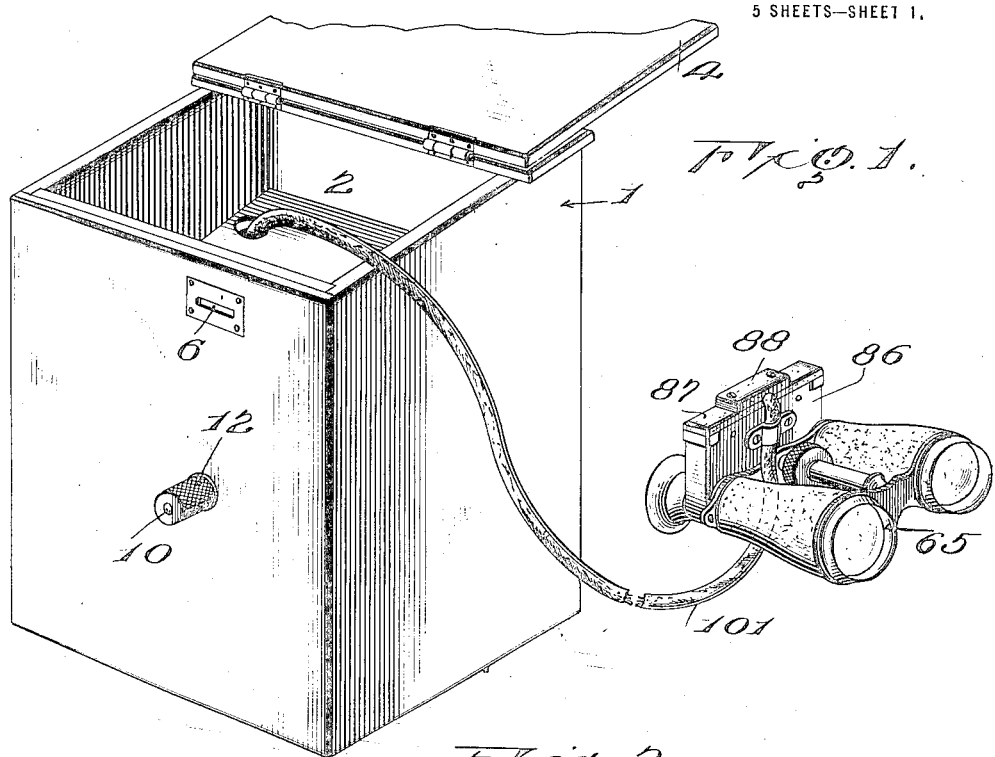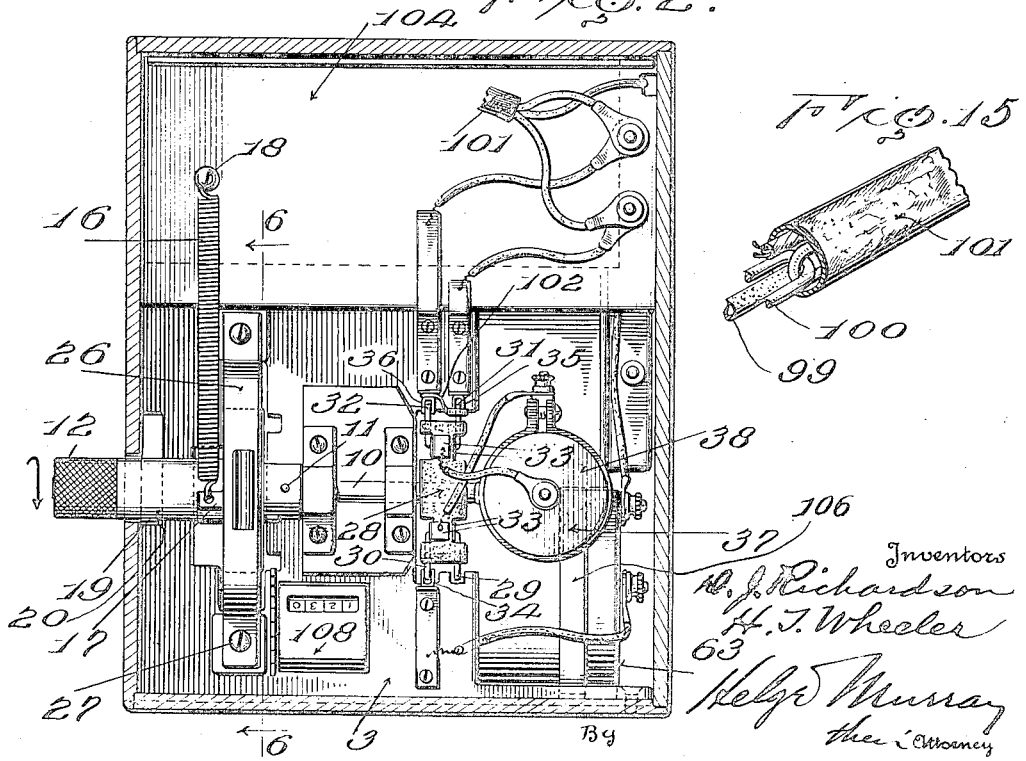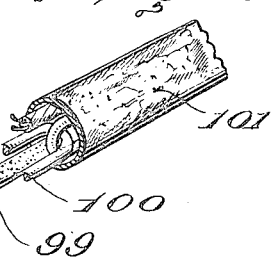

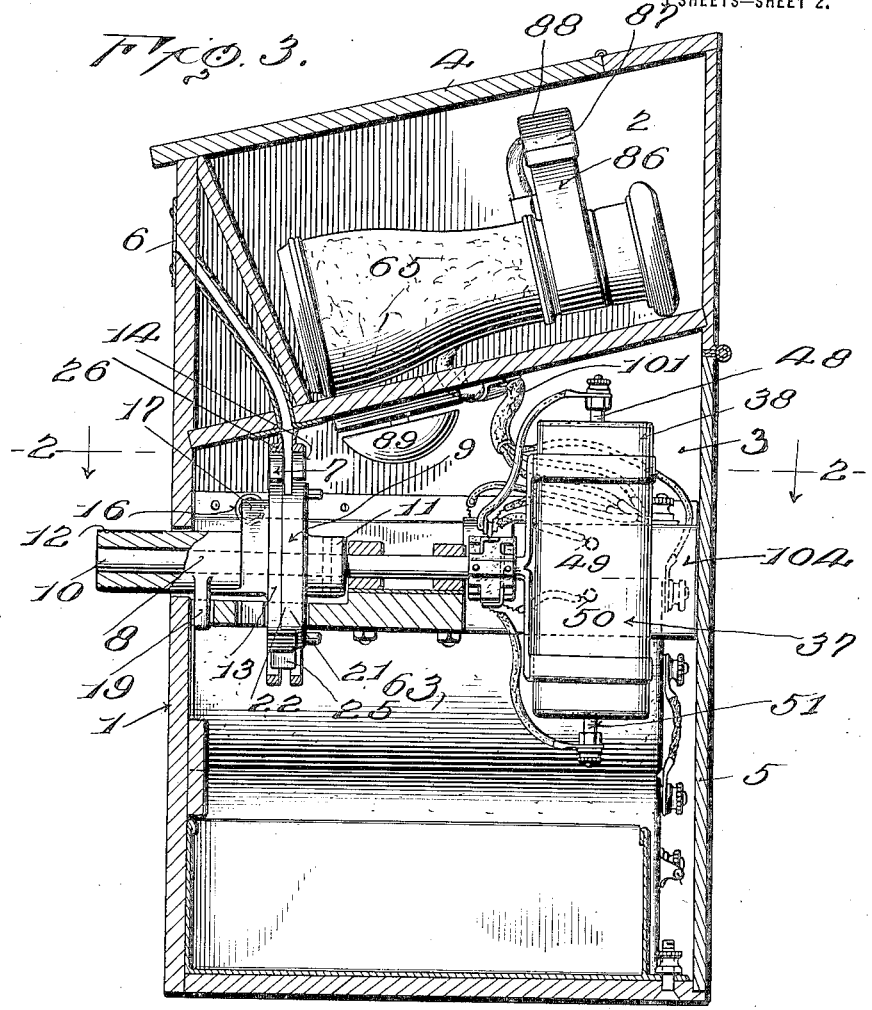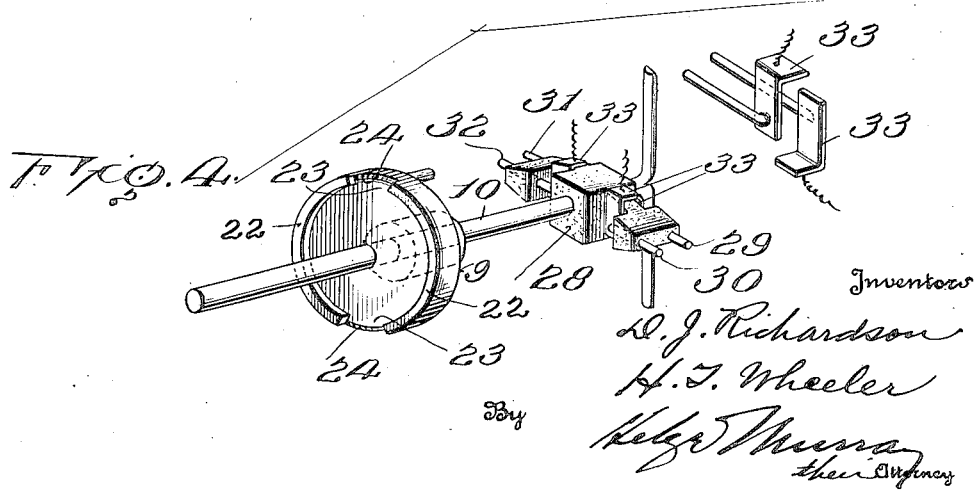

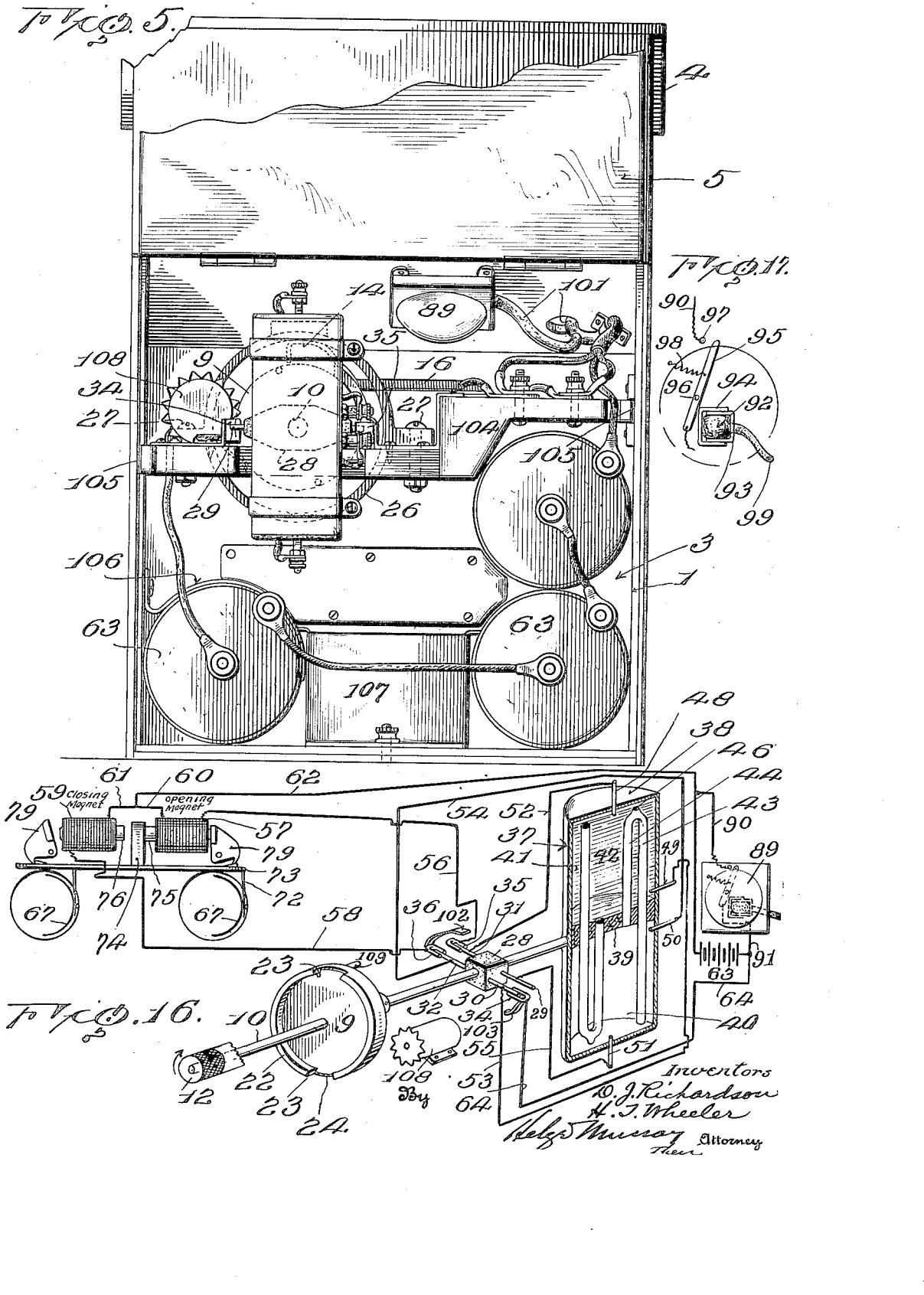

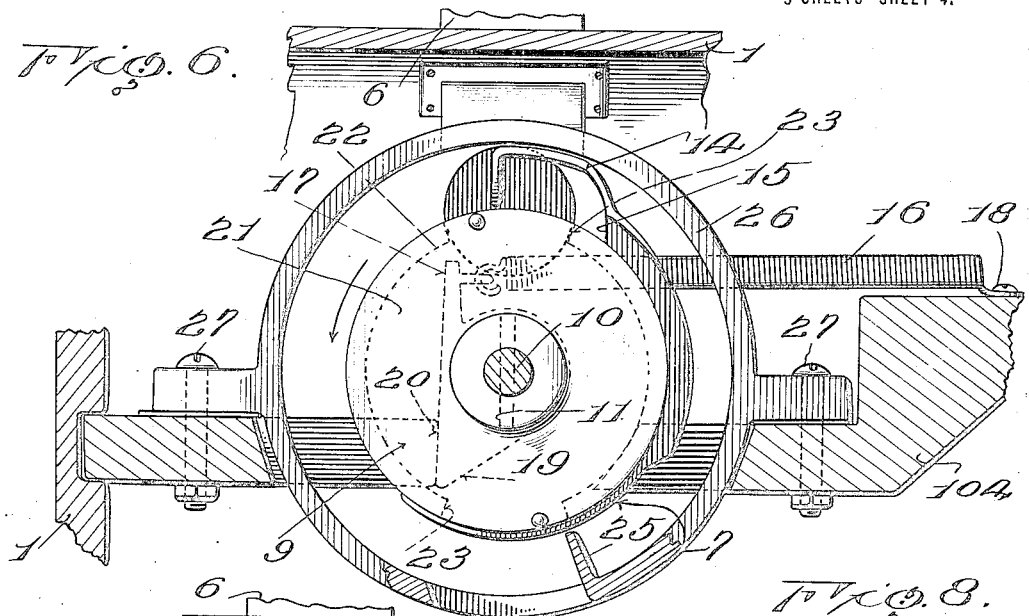
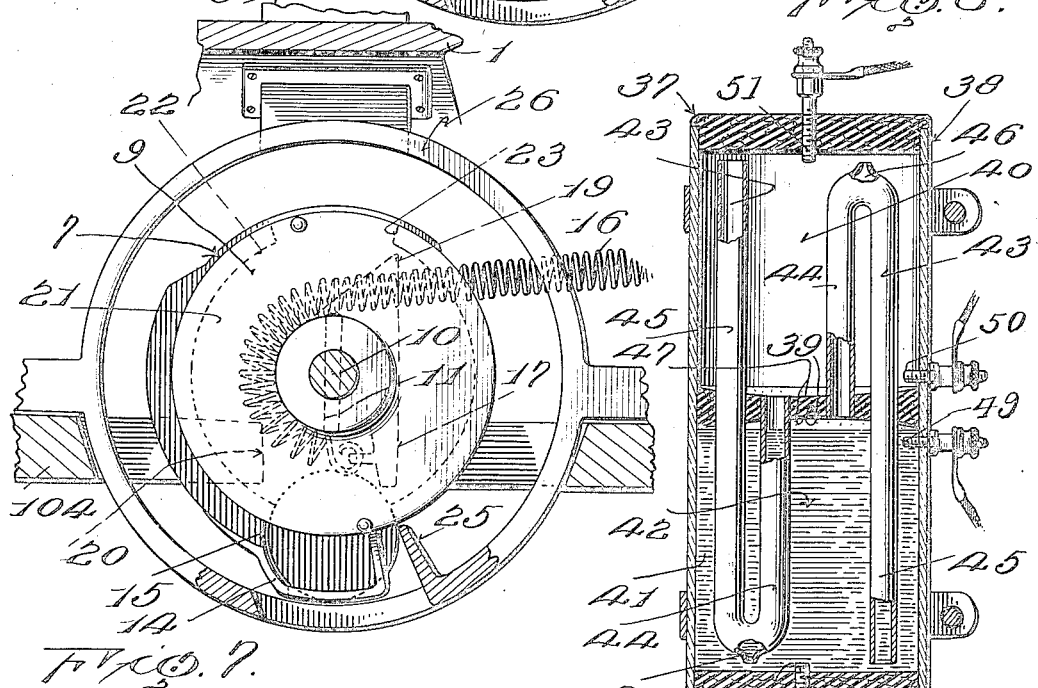

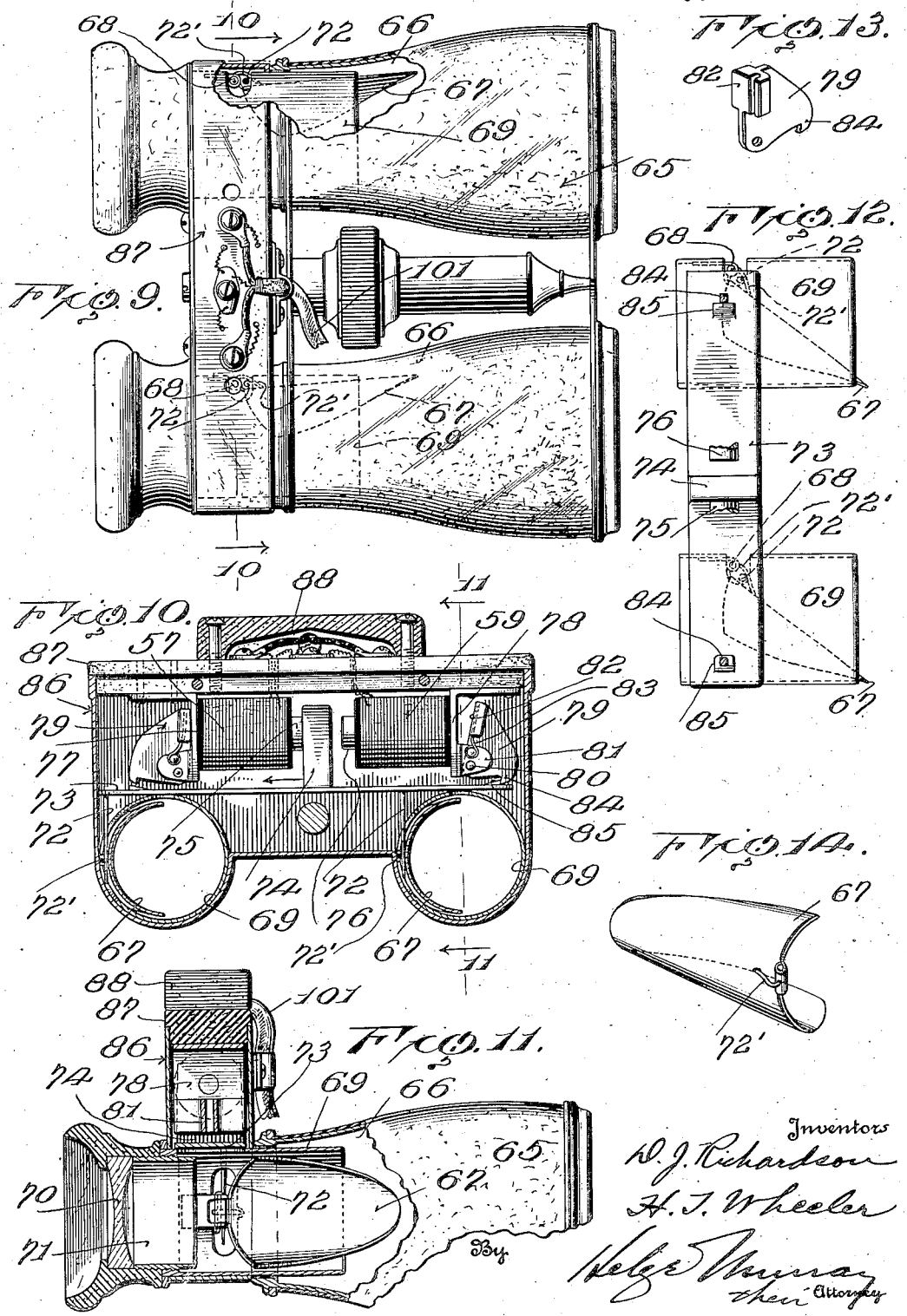

1,434,845

UNITED STATES PATENT OFFICE.

DANIEL J. RICHARDSON AND HARRY T. WHEELER, OF WASHINGTON, DISTRICT OF COLUMBIA.

COIN-CONTROLLED OBSERVATION APPARATUS.

Application filed January 15, 1921. Serial No. 437,461.

*To all whom it may concern:*

Be it known that we, DANIEL J. RICHARDSON and HARRY T. WHEELER, citizens of the United States, residing at Washington, in the District of Columbia, have invented certain new and useful Improvements in Coin-Controlled Observation Apparatus, of which the following is a specification.

The present invention relates to observation apparatus, and has been designed more especially for use in connection with a coin controlled mechanism wherein the depositing of a coin will permit of a predetermined period of view through the observation device.

Heretofore certain attempts have been made to produce a successfully operated apparatus of this character, but these efforts have proved to be inadequate in rendering the apparatus commercially successful. The unusually large amount and continuous consumption of electric current, the uncertain actuation of the view obstructing means, and uncertain and complicated timing mechanism have been some of the obstacles which have made inventions of this character inefficient and consequently unacceptable for use in general by the public.

To this end this invention has been designed to overcome these experienced difficulties, and has for its object the production of means including a novel switch mechanism electrically connected with a positively actuated shutter mechanism in the observation device, and a comparatively simple and effective timing mechanism interconnected with a suitable coin operating means, a minimum amount of electric current being utilized to effect the successive operations of the apparatus.

Another object of this invention is to provide a coin controlled observation apparatus having a combined switch and timing mechanism, the operation of which is dependent upon the depositing of the proper coin and the moving of the switch and timing device.

Another object of this invention is the production of a timing device including a movable element having therein a mobile material the properties of which permit the flow of an electric current therethrough, there being electrical circuits provided for conducting and interrupting the flow of the electric current through the mobile material.

Another object of the invention is to provide a timing mechanism having means for permitting the proper transfer of the mobile material during proper time intervals, and provide for the direct flow of the mobile material and attendant air currents.

A further object of this invention is to produce a positive mechanism for controlling the period of view through the observation device, said mechanism including co-operating devices capable of exerting magnetic force when energized, each of which is double acting and serves to lock the view obstructing shutter in both closed and open positions.

A further object is to provide a relatively compact view obstructing mechanism including a positively operated shutter capable of being positioned within the visual tube so as to prevent an irregular or obstructed view therethrough when opened, the actuating means for said shutter being located upon the outside of the apparatus or at a point remote from the visual tube.

A still further object of this invention is to provide novel means for connecting the observation apparatus with the switch controlled and timing mechanism, said connection comprising a relatively tough casing in which are mounted the electrical conductors, a strong securing element such as a chain, for example, and a burglar detecting device, the latter serving to sound an audible alarm should the connecting device be severed.

A still further object of this invention is to provide a relatively small containing receptacle for the several mechanisms, each of which has been designed and associated for ready removal and inspection as separate units of the apparatus.

A still further object is to provide in association with the present observation apparatus, a novel coin control mechanism capable of being operatively connected with the switch and timing devices, so that anything other than the proper depositing of a single coin of the proper denomination will prevent the operation of the apparatus.

In the accompanying drawings which illustrate an embodiment of our invention as applied to what might be termed an ordinary pair of field glasses or binoculars:

Fig. 1 is a perspective view showing the container opened, and the glasses removed for use;

Fig. 2 is a horizontal sectional plan view on the line 2—2 of Fig. 3;

Fig. 3 is a vertical sectional view through the apparatus with the glasses positioned within the container;

Fig. 4 is a detached perspective view of the switch and its contacts as associated with the coin control receiving device and supporting shaft;

Fig. 5 is a rear elevation of the apparatus with the back door lifted;

Fig. 6 is a detail transverse sectional view through the coin control mechanism, a coin having been deposited therein;

Fig. 7 is a view similar to Fig. 6, showing the coin control mechanism having been operated in the direction of the arrow, and the coin about to be deposited into a suitable receiving box;

Fig. 8 is a vertical sectional view through the movable timing element illustrating the mobile material in the lower compartment and the material and air directing tubes, and associated electrical contacts;

Fig. 9 is a plan view partly broken away illustrating an ordinary pair of field glasses or binoculars with our improved view obstructing shutter mechanism applied;

Fig. 10 is a transverse section therethrough on the line 10—10 of Fig. 9;

Fig. 11 is a vertical sectional view partly in elevation on the line 11—11 of Fig. 10;

Fig. 12 is a detached plan view of a portion of the shutter mechanism showing the shutters moved to the closed or view obstructing position;

Fig. 13 is a detail perspective view of one of the locking devices for the shutter mechanism;

Fig. 14 is a detached perspective view of one of the view obstructing shutters;

Fig. 15 is a detail sectional perspective view through the connection between the operating mechanism and the binoculars;

Fig. 16 is a view in diagrammatic illustration of the several mechanically associated and electrically connected mechanisms; and Fig. 17 is a detail diagrammatic view of a part of the audible alarm.

This present invention has been designed for use with ordinary field glasses or binoculars, wherein a user upon depositing the proper coin is permitted to view the desired scenery and other objects for an interval of time, after which the shutter mechanism is automatically operated and the view will be obstructed until another coin has been deposited and the machine operated. It will be understood, however, that the several mechanisms which are mechanically and electrically associated in this invention are not limited to field glasses or binoculars, but may be adapted to other devices of varying constructions, wherein it is desirable to provide predetermined timed and periodic operations.

Referring to the drawings in which like reference characters designate similar parts in the several views, our invention comprises among other things, a coin control device, an interconnected electric switch and timing mechanism, a view obstructing means electrically connected with the switch and timing mechanism, and a burglar detecting device.

The several mechanisms are preferably located within a suitable container 1 formed with an upper compartment 2 arranged to receive the field glasses or other visual means, and a lower compartment 3 in which latter is arranged the operating mechanism. The upper compartment 2 is preferably provided with a hinged cover 4 which may be provided with an auxiliary locking device, not shown. The lower compartment 3 is provided with a hinged door 5, which may also be provided with any form of locking mechanism, not shown.

The container 1 may be formed of any suitable material and the several parts thereof connected in any approved form for purposes of assembly. It is preferably dust and water proof and shaped to snugly enclose the several parts.

Located within the upper portion of the container and preferably in the front thereof is a coin chute 6 arranged to communicate with the coin receiving device 7. This coin receiving device is preferably composed of complementary members 8 and 9, the former being loosely mounted upon a shaft 10, and the latter being keyed on the said shaft as at 11. The complementary member 8 is preferably provided with a knurled operating knob 12 extending through the front wall of the container within reach of an operator. This member 8 is provided with a flange portion 13 from which extends concentrically thereof a slotted frame 14. A shoulder 15 is provided on this frame section, and is designed to abut against the coin as shown in Fig. 7. A spring 16 is connected to an arm 17 extending from the complementary member 8, the opposite end of said spring being secured to a relatively fixed part of the supporting frame as at 18. Provided on the complementary member 8 is a stop 19, adapted to normally engage with a shoulder 20 formed on the aforesaid supporting frame. The spring 16 serves to normally hold the stop 19 against the shoulder 20 as shown in Fig. 6.

The complementary member 9 of the coin receiving device comprises a disk-like body portion 21 having a circular flange 22. This flange 22 is interrupted diametrically as at 23, the opposite ends of the flange being suitably curved to conform to the coin deposited therebetween. The outer edge of the disk-like body portion may be slightly beveled as at 24 to permit of the coin readily seating between the ends of the interrupted flange 22.

The size of the interrupted flange 22 and the width of the space of the interrupted portions are designed to receive a corresponding size coin. For example, the thickness of a nickel and its diameter would determine these measurements, thereby providing means capable of preventing the use of other unauthorized coins or disks of a smaller size, should a smaller size coin such as a dime or penny or similar article be inserted, it will fall through the spaces 23 and the apparatus cannot be actuated. A larger size coin could not be deposited in the coin chute.

When the coin is deposited through the chute and falls to the coin receiving mechanism, as shown in Fig. 6, the operating knob or handle 12 is turned in the direction of the arrow, thereby bringing the shoulder 15 of the frame 14 against the coin. A continued movement of the operating knob causes the complementary members 8 and 9 to revolve in unison to the position shown in Fig. 7, at which time the coin strikes against the stop 25 formed on the coin retaining encircling frame 26 secured as at 27 to the supporting frame hereinbefore referred to.

As the coin receiving device is revolved, the shaft 10 is correspondingly rotated a one-half revolution, thereby operating the switch mechanism now to be described.

Referring to Fig. 4, the switch 28 is secured to the shaft 10, and comprises four switch arms 29, 30, 31 and 32. Switch arms 29 and 30 are diametrically arranged to the arms 31 and 32. Each of these switch arms is provided with a current conducting plate 33 suitably secured to said arm and adapted to convey electric current thereto.

The four switch arms are designed to co-operate with three switch contact members diagrammatically arranged as shown in Fig. 16. These switch contact members are indicated at 34, 35 and 36. The switch arms 29 and 31 serve to successively contact with the switch contact member 35; and the switch arms 30 and 32 serve to successively contact with the switch contact members 34 and 36 upon each half revolution of the shaft 10 and the switch carried thereby.

The switch arms extending from the switch proper are suitably supported and insulated, and the associated switch contact members are also suitably supported and insulated.

Upon each half revolution of the shaft 10 the respective switch arms are changed with respect to their contact members, thereby varying the operation of the device as will more fully hereinafter be described in connection with the operation of the apparatus. This successive changing of the switch arms is necessitated by reason of the timing mechanism 37 and more especially the movable material containing chamber 38 now to be described.

The timing mechanism is connected to or supported upon the shaft 10, and is designed to rotate therewith. It comprises the container 38 intermediately divided by means of a partition 39 separating the said container into compartments 40 and 41.

Provided within the container 38 is a transferable material 42 adapted to pass from one compartment to the other in a predetermined time interval. This material is preferably mercury and, due to its weight, cohesiveness and other properties, a novel means for effecting the transfer thereof from one compartment to the other has been provided. This means includes oppositely arranged conduits 43 each of which is turned back upon itself as shown, the shorter portion 44 thereof terminating in partition 39 and the longer period 45 thereof extending well up into the respective chambers 40 and 41 as shown in Fig. 8. Outlet openings 46 are provided in these conduits 43, the size of said openings being relatively small, the exact size of this opening depending upon the quantity of movable material used, the time of passage desired, and the relative size of the container. For purposes of illustration it is well within an exceedingly small fraction of a part of an inch and may be stated to be that of a pin-point when the consistency and physical and chemical properties of the mobile material are similar to that of mercury.

As shown in Fig. 8 the material has been parent transferred to the lower chamber, it being apparent that a quantity of mercury remains in both short and long portions of the respective conduits or tubes.

When the movable element is reversed and the chamber containing the mercury is brought to an uppermost position, the mercury within the conduit is rather rapidly discharged and the main portion of the mercury begins to flow downwardly through the shorter conduit or tube out through the pin-point opening into the empty lower chamber. The emptied conduit, and more especially the small opening therein, now serves to permit of the venting of the lower chamber and the passage of the air upwardly, thereby effecting an even and complete exchange of the liquid and air contents between the respective chambers. The complete transfer of the material from one chamber to the other is thereby accomplished and any tendency of the material to be restricted in its flow is obviated. The dividing partition 39 may be curved as shown at 47 to more readily facilitate the complete discharge of the material.

Terminals 48, 49, 50 and 51 in the form of contact elements are arranged to extend into the chambers of this timing device, the contacts 48 and 49 being positioned and extending into the chamber 41; and the contacts 50 and 51 being arranged to extend within the chamber 40.

These terminals or contacts are preferably adjustable through the walls of the container and are insulated therefrom. Electrical conductors extend from these terminals and are connected with the electrical circuit hereinafter to be described in connection with the view or shutter obstructing mechanism and the controlling switch.

The location and adjustment of the contacts within the respective chambers 40 and 41 are such that when the liquid is contained within one of said chambers, the respective contacts therein are covered by the liquid and an electrical circuit is closed through said liquid. The duration of the closing of this circuit is comparatively short in that the liquid begins to flow from the chamber when inverted and uncovers one of the contacts therein, thereby opening the circuit and stopping the flow of the electric current.

During the transfer of the liquid, certain contacts in each of the chambers 40 and 41 are covered by the liquid and an electric circuit established therebetween and through the liquid. This circuit is established through the contacts 49 and 50, the mercury having almost discharged from the upper chamber 40 but still covering the contact 50; and the said mercury having collected and risen in the lower chamber 41 to a height where it covers the contact 49. The duration of the closing of this circuit is comparatively short as the mercury continues to flow from the chamber 40 and uncover the contact 50, at which time the circuit is broken and the flow of the electric current is stopped. When the mercury has collected in the lowermost chamber 41 as shown in Fig. 8, contacts 48 and 49 are covered. In this position, however, no circuit is established, there being an interruption of the circuit through the switch 28, the arms 29 and 31 of which latter are successively and alternately moved to open positions upon each operation of the switch.

The electric circuits between the timing mechanism and the switch are shown diagrammatically in Fig. 16, the terminals or contacts 48, 49, 50 and 51 of the timing mechanism being each provided with an electrical conductor connected to the respective arms of the switch 28.

The conductor 52 leads from the contact 48 to the switch arm 31; the conductor 53 leads from the contact 49 to the switch arm 30; the conductor 54 leads from the contact 50 to the switch arm 32; and the conductor 55 leads from the contact 51 to the switch arm 29.

The switch contact members 34, 35 and 36 hereinbefore referred to, (see Fig. 16), are each provided with electrical conductors, now to be described as connected to the shutter or view obstructing means and a suitable source of electrical current. Leading from the switch contact member 35 is a conductor 56 adapted to connect with an electromagnet, solenoid or similarly acting device 57 termed herein the "shutter opening magnet." A conductor 58 leads from the switch contact member 36 to another magnet, solenoid, or similarly acting device 59, termed herein the "shutter closing magnet." Leading from and connecting the two electromagnets 57 and 59 are conductors 60 and 61, both of which are connected or merged into a common conductor 62, the latter being connected to one terminal of a suitable source of electric current illustrated by the battery 63. A conductor 64 extends from the opposite terminal of said battery and connects with the switch contact member 34. The foregoing electrical association of switch mechanism, timing device, and shutter or view obstructing means, constitutes a particularly effective utilization of the electric current in minimum quantities, and at the same time provides for positive control and actuation of the several mechanisms.

The proper control and actuation of the shutter or view obstructing means in the visual tube has heretofore been one of the problems which has remained unsatisfactorily solved. The comparatively limited space usually found available in field glasses, binoculars and other observation apparatus, together with the rough usage to which they are sometimes subjected, has contributed to the difficulties of producing a positive mechanism located in the glasses and capable of properly closing and opening the shutter at predetermined time intervals with a minimum amount of electricity.

Our present shutter or view obstructing means, is best illustrated in Figs. 9 to 14, inclusive. An ordinary pair of field glasses or binoculars is shown at 65 having arranged in each visual tube 66 thereof, a shutter or view obstructing device 67. Each shutter is pivotally mounted at 68 to a sleeve 69 interposed and threaded, or otherwise secured within the glasses. The sleeve 69 is slightly larger than the lens 70, and its associated tube 71, thereby permitting of the pivotal mounting of the shutter in a plane outside of the visual opening, and otherwise provide for the complete open movement of the shutter so as not to interfere with the usual clear and unobstructed view through the glasses. The usual adjustment of the glasses for purposes of focusing is maintained.

The operating connection for each shutter consists of a rod or pin 72 depending from the bar 73, the latter being movably controlled by the electromagnets 57 and 59 hereinbefore referred to. The rod 72 is retained in a suitable connection in the form of a loop 72' designed to facilitate the assembly of the mechanism.

The bar 73 is provided with an extension 74 interposed between the ends 75 and 76 of the respective magnets 57 and 59. The opposite ends 77 and 78 of the respective electromagnets are also energized at the time of energization of their respective ends 75 and 76, thereby actuating a locking device for maintaining the shutter in either opened or closed position.

The locking device comprises latches 79 pivoted at 80 to brackets 81. Each latch is provided with a surface or face 82 adapted to be drawn against the energized end of the electromagnet. A spring 83 is provided on said latches for normally holding the face 82 of the latch out of contact with the end of the magnet.

A locking finger 84 is provided on each latch and is designed to cooperate with a projecting lug 85 carried by the bar 73. Two of these lugs 85 are provided, one cooperating with the latch operably associated with the "shutter opening magnet" 57, and the other cooperating with the latch which is operated by the "shutter closing magnet" 59.

In operation, and assuming that the opening magnet 57 has been energized, the latch 79, and the projection 74 of the bar 73 are simultaneously attracted by the opposite ends 75 and 77 of said magnet, thereby causing the locking finger 84 of the latch to become disengaged from the lug 85 and permit the bar 73 to be laterally moved in the direction of the arrow shown in Fig. 10. This movement causes the shutters to be swung open on their pivots by reason of their connection with the depending operating rods 72 carried by the bar 73.

Upon deenergization of the opening magnet 57, the latch is pressed away from the end 77 of the magnet, the locking finger 84 of said latch resting upon the upper surface of the engaging lug 85. The projection 74 and the bar 73 by which it is carried remain stationary however upon deenergizing the magnet, the opposite latch and its locking finger 84 engaging the lug 85 as best shown in Fig. 10. By this construction the shutters are locked opened. When the closing magnet 59 is energized after a predetermined time interval during which a user has had an unobstructed view through the glasses, the projection 74 and the latch 79 controlled by said closing magnet are simultaneously operated, thereby causing the bar 73 to move laterally in an opposite direction to that of the arrow shown in Fig. 10, for closing the shutters. The reverse action of the locking fingers is repeated and the shutters are now maintained in a locked closed position with the view through the glasses obstructed.

The operating means for the view obstructing shutters is located upon the outside of the field glasses and is preferably contained within a casing or housing 86 having a cover plate 87 secured thereto. Various other means may be employed to house and attach the shutter operating mechanism to the glasses, it being always desirable however, to locate such mechanism at a point remote from the point in the visual tube so as to avoid any interference with the line of vision, or otherwise materially change the construction of what might be termed standard make field glasses or binoculars. The electromagnets and the latches pivoted thereto are preferably carried by the cover plate, thereby permitting ready removal for purposes of inspection and repair. The terminal ends for the conductors are preferably located beneath a cap plate 88 of insulating material secured to the cover 87. The attachment of this housing 86 and associated parts to the glasses may be made in any one of several ways, screws, and concealed locking means (the latter being not shown) preferably being employed to prevent the unauthorized detaching of the glasses.

As a means for further preventing the removal of the glasses in an unauthorized manner, we provide a burglar detecting device including a bell 89 electrically connected by means of the conductors 90 and 91 to the battery circuit of the apparatus, see Fig. 16. A novel means for actuating the bell is also provided, said means including an inflated member 92 interposed between relatively fixed and movable members 93 and 94. The movable member 94 is adapted to normally bear against one end of a lever 95 pivotally mounted at 96, thereby keeping the switch contacts 97 in normal open position against the tension of the spring 98.

The inflated member 92 is preferably of rubber and is designed to receive a sufficient pressure capable of maintaining the switch in open position. Communicating with the said inflated member 92 is a tube 99 in which the aforesaid pressure is constantly maintained. Referring to Fig. 15, this tube is concealed together with the electric conductors and a securing chain 100 in a protecting casing 101, the latter and its contents constituting the connecting device between the observation glasses and the controlling apparatus therefor.

Should the connecting device be severed, the pressure within the tube 99 and the communicating inflated member 92 will be immediately released, thereby permitting the spring 98 to pull the lever 95 and close the switch contacts 97 in turn causing the audible bell or other alarm to sound.

The operation of the invention will now be described, beginning with the apparatus in normal, inoperative position. In this position the operating handle 10 is disengaged from the timing mechanism and switch so that any manipulation thereof will not actuate the apparatus. The timing mechanism and more especially the transferable liquid in the container 38 is in the position shown in Fig. 8, with the mercury in the lowermost chamber.

The shutter or view obstructing means is in closed position as shown in dotted lines in Fig. 12. No electric circuit is closed with the several mechanisms in the above referred to positions.

To operate the apparatus a coin is deposited through the chute or coin slot 6 and drops to the coin receiving device 7. The interpositioning of the coin between the complementary members 8 and 9 of said coin receiving device serves to clutch the two members together and permit of their rotation in unison. These members constitute a clutch which is normally disengaged, but which is capable of being engaged when the coin is deposited in the apparatus.

The operating handle or knob 12 is now revolved and the shaft 10 is rotated a one-half revolution, the container 38 of the timing mechanism secured to said shaft 10 being also revolved a one-half revolution, as is also the switch 28 likewise secured to the shaft 10.

In bringing the container and switch to the position shown in Fig. 16, it will be seen that the transferable liquid is now in the uppermost chamber and is ready to flow therefrom to the lowermost chamber in a predetermined interval of time. When the apparatus is moved to the position shown in Fig. 16, a circuit is established for actuating the "shutter opening magnet" 57. This circuit may be traced as follows: current passing from the battery 63 through conductor 62 to the opening magnet, then from said magnet, through the conductor 56 to the switch contact member 35; thence to the switch arm 31, and through the conductor 52 to the contact 48 in the filled uppermost chamber. The current then flows through the liquid to the contact 49 in said chamber; then through the conductor 53 to the switch arm 30 where it then passes to the switch contact arm 34 and its conductor 64 to the opposite terminal of the battery 63. This circuit is maintained sufficiently long to energize the opening magnet and positively actuate the bar 73 and its shutter connections as hereinbefore described. The length of time that this circuit is maintained is dependent upon the flow of the liquid from the now uppermost chamber in the container, for as soon as the level of the liquid falls below the upper contact in said chamber, the circuit is immediately broken and the flow of the electric current is stopped. By adjusting the contact in the chamber this period of time may be varied. A period of ten seconds may be allowed to effect the energization of the magnet and open the shutter, but this time interval may be either increased or diminished as circumstances require. It will be noted that the remainder of the time interval during which the view is unobstructed in the visual tube may extend over a period of several minutes, more or less, and further that during this comparatively long period the electric current is not being used.

As the liquid accumulates in the now lowermost chamber it ultimately reaches the upper contact therein. Some of the mercury still being in the uppermost chamber and still covering the lower contact, another circuit is now established between these said contacts, and the shutter closing magnet is energized. This circuit may be traced from the battery through the conductor 62 and its branch 61 to the closing magnet 59; through said magnet and conductor 58 to the switch contact member 36, and switch arm 32; and thence through the conductor 54 to the upper contact in the chamber 40. The current now passes through the liquid to the lower contact in the chamber 41, and then through the conductor 53 to the switch arm 30 and contact switch member 34, from which latter contact it passes to the opposite battery terminal through the conductor 64.

The length of time during which the circuit is established is comparatively brief, a few seconds being sufficient to energize the closing magnet 59 and actuate the shutter closing mechanism. The flowing liquid soon leaves the lower contact in the uppermost chamber and the circuit is immediately broken, the shutter or view obstructing means being closed with the flow of the electric current stopped. It will be noted that one or the other switch arms 29 and 31 is always left free of any contact switch member, thereby assuring interruption in the circuit even though both contacts in the respective chambers 40 and 41 may at periodic intervals be covered by the liquid.

The apparatus has now been used for a predetermined time interval, and canot be operated until another coin is deposited and the foregoing operation repeated.

As a means for preventing the defrauding of the apparatus by a rapidly repeated turning of the operating knob 12 and its associated switch and timing mechanism, when a plurality of coins has been inserted, we provide supplemental contact members 102 and 103, carried respectively by two of the switch contact members 36 and 34. The contact member 102 is carried by the switch contact member 36 and is offset therefrom so as to be engaged by the switch arms 29 and 31 as they are revolved. The contact 103 is momentarily engaged by the switch arms 30 and 32 as the switch is revolved. This construction keeps the contact 102 in circuit with the closing magnet, and as the switch arms 29 and 31 are in circuit with the contacts 48 and 51, it will be seen that a continuous revolving of the container 38 with the liquid substantially filling either of the chambers 40 or 41, establishes a closed circuit upon each half revolution of the operating knob and insures the operation of the closing magnet 59, and the closing of the shutter for obstructing the view.

The several mechanisms of the apparatus are preferably grouped in removable units thereby facilitating the assembly and removal of same for purposes of repair and inspection. The coin receiving device, switch and timing mechanism are preferably associated and may be mounted upon a supporting shelf or frame 104 detachably supported in the box or container 1.

Suitable guides 105, see Fig. 5, may be provided to insure this proper support and sliding removal of the shelf 104.

The batteries 63 may be held rigidly in place by means of the offset portion of the shelf 104 and a further retaining plate 106 may also be used as shown in Fig. 5.

The coin box 107 may be of any approved form and detachably positioned and secured within the lower compartment 3.

A registering or counting device 108 of a known construction may be interconnected with our apparatus and operated in any suitable way, by means of pins 109 for example, carried by the relatively fixed complementary member 9 of the coin receiving device.

Various changes in the construction and arrangement of the several parts as well as the size and proportion of the same may be resorted to, and we do not limit ourselves to the exact disclosure herein set forth, our invention including other embodiments, advantages and objects.

We claim:

1. An electrically controlled observation device having a visual opening means for obstructing the view through said opening, said means including an electric circuit for operating the view obstructing means, means for stopping the flow of the electric current immediately following the operatiton of the view obstructing means, and means for maintaining the view obstructing means in either opened or closed position when the flow of the electric current is interrupted.

2. An electrically controlled observation device having a visual opening means for obstructing the view through said opening, said means including an electric circuit for operating the view obstructing means, and means for interrupting the flow of the electric current after the opening and closing respectively of the view obstructing means.

3. An electrically controlled observation device having a visual opening means for obstructing the view through said opening, said means including an electric circuit for operating the view obstructing means, means for stopping the flow of the electric current after the opening and closing respectively of the view obstructing means, and means independent of the electric circuit for maintaining the view obstructing means in fixed relation to the observation device.

4. An electrically controlled observation device having a visual opening, means for obstructing the view through said opening, said means including an electric circuit for operating the view obstructing means, and means for determining the time interval during which the visual opening is unobstructed, said means also serving to stop the flow of the electric current during the major portion of the time interval that the visual opening is unobstructed.

5. An electrically controlled observation device having a visual opening, means for obstructing the view through said opening, said means including an electric circuit for operating the view obstructing means, means for determining the time interval during which the visual opening is unobstructed, said means also serving to stop the flow of the electric current during the major portion of the time interval that the visual opening is unobstructed, and means for stopping the flow of the electric current when the view obstructing means has been moved to closed position.

6. An electrically controlled observation device having a visual opening, means for obstructing the view through said opening, said means including an electric circuit for operating the view obstructing means, means for determining the time interval during which the visual opening is unobstructed, said means also serving to stop the flow of the electric current during the major portion of the time interval that the visual opening is unobstructed, means for stopping the flow of the electric current when the view obstructing means has been moved to closed position, and means for maintaining the view obstructing means when either opened of closed, in fixed relation to the observation device.

7. An electrically controlled observation device having a visual opening, means for obstructing the view through said opening, said means including an electric circuit for operating the view obstructing means, and means for determining the time interval during which the visual opening is unobstructed, said means also serving to control the interruption of the flow of the electric current after the opening and closing respectively of the view obstructing means.

8. An electrical coin controlled observation apparatus including in combination a visual tube, means for obstructing the view through said tube, said means including an electric circuit for operating the said view obstructing means, a switch for controlling the flow of the electric current, means including a coin receiving device for permitting the operation of said switch, and a timing mechanism for controlling the period during which the visual tube is unobstructed, said timing mechanism also serving to stop the flow of the electric current after the opening and closing respectively of the aforesaid view obstructing means.

9. An electrical coin controlled observation apparatus including in combination a visual tube, means for obstructing the view through said tube, said means including an electric circuit for operating the said view obstructing means, a switch for controlling the flow of the electric current, means including a coin receiving device for permitting the operation of said switch, means for determining the time interval during which the visual tube is unobstructed, said means also serving to stop the flow of the electric current after each operation of the view obstructing means, and means for maintaining the said view obstructing means in either closed or opened position when the flow of the electric current is interrupted.

10. An electrical coin controlled observation apparatus including in combination a visual tube, means for obstructing the view through said tube, said means including an electric circuit for operating the said view obstructing means, a switch for controlling the flow of the electric current, means including a coin receiving device interconnected with said switch for permitting the operation thereof, and a timing mechanism for controlling the period during which the visual tube is unobstructed, said timing mechanism also serving to stop the flow of the electric current during the greater portion of the time that the visual tube is unobstructed.

11. An electrical coin controlled observation apparatus including in combination a visual tube, means for obstructing the view through said tube, said means including an electric circuit for operating the said view obstructing means, a switch for controlling the flow of the electric current, means including a coin receiving device interconnected with and adapted to control the operation of said switch, a timing mechanism for determining the period during which the visual tube is unobstructed, said timing mechanism also serving to stop the flow of the electric current during the greater portion of the time that the visual tube is unobstructed, and means for stopping the flow of the electric current immediately after the closing of the view obstructing means.

12. An electrical coin controlled observation apparatus including in combination a visual tube, means for obstructing the view through said tube, said means including an electric circuit for operating the said view obstructing means, a switch for controlling the flow of the electric current, means including a coin receiving device for permitting the operation of said switch means for determining the time interval during which the visual tube is unobstructed, said means also serving to stop the flow of the electric current after each operation of the aforesaid view obstructing means and means for locking the view obstructing means in either closed or opened position after each operation thereof.

13. The combination of an electrically controlled observation apparatus having a visual opening, means for obstructing the view through said opening, said means including an electromagnet adapted to be energized for effecting the operation of the view obstructing means, and means immediately deenergizing the electro-magnet following every operation of the view obstructing means.

14. The combination of an electrically controlled observation apparatus having a visual opening, means including a shutter for obstructing the view through said opening, an electromagnet for opening and closing said shutter, and means actuated by said electromagnet for locking the aforesaid shutter in opened and closed position.

15. The combination of an electrically controlled observation apparatus having a visual opening, means including a shutter for obstructing the view through said opening, a locking device for said shutter and an electro-magnet for simultaneuously operating the shutter and locking device.

16. The combination of an electrically controlled observation apparatus having a visual opening, means including a shutter for obstructing the view through said opening, an electromagnet adapted to be energized for effecting the opening and closing of said shutter, means for deenergizing said magnet immediately following the operation of the shutter, and means for positively holding said shutter against movement in either opened or closed position.

17. The combination of an electrically controlled observation apparatus having a visual opening, with a view obstructing device, and a timing mechanism for determining the time interval during which the visual opening is unobstructed, said timing mechanism including a movable element having a transferable mobile material contained therein and a plurality of electrical contacts adapted to be closed and opened through the movement of the aforesaid mobile material.

18. The combination of an electrically controlled observation apparatus having a visual opening, with a view obstructing device, and a timing mechanism for determining the time interval during which the visual opening is unobstructed, said timing mechanism including a container having mobile material therein, a plurality of electrical contacts adapted to be closed and opened through said material and means for permitting the flow of said mobile material in said container.

19. The combination of an electrically controlled observation apparatus having a visual opening, with a view obstructing device, and a timing mechanism for determining the time interval during which the visual opening is unobstructed, said timing mechanism including a container having mobile material therein, a plurality of electrical contacts adapted to be closed and opened through said material, means for permitting the flow of said material in said container, and means for permitting the aforesaid container to be bodily moved to reverse the flow of said mobile material.

20. The combination of an electrically controlled observation apparatus having a visual opening, with a view obstructing device, and a timing mechanism for determining the time interval during which the visual opening is unobstructed, said timing mechanism including a divided container having a transferable mobile material therein, electrical contacts provided in each of the divided portions of said container and adapted to be closed and opened through said material, and means for permitting the transfer of said mobile material from one to another of the divided portions of the container.

21. The combination of an electrically controlled observation apparatus having a visual opening, with a view obstructing device, and a timing mechanism for determining the time interval during which the visual opening is unobstructed, said timing mechanism including a divided container having a transferable mobile material therein, means for permitting the transfer of said material from one to another of the divided portions of the container, and a plurality of electrical contacts in each of the divided portions of said container adapted to be closed and opened through the mobile material, said electrical contacts being arranged whereby the circuit is closed and then opened through the contacts in one of the divided portions of said container, and subsequently closed and opened through contacts located in each of the divided portions of said container.

22. The combination of an electrically controlled observation apparatus having a visual opening, with a view obstructing device, and a timing mechanism for determining the time interval during which the visual opening is unobstructed, said timing mechanism including a divided container having a transferable mobile material therein, means for permitting the flow of said material from one to another of the divided portions of the container, and a series of contacts provided in the divided portions of said container, the contacts in each divided portion of the container being arranged and adapted to be first closed and opened through the flowing of the material, and certain of the contacts of each of the aforesaid series in the respective divided portions of the container being arranged and adapted to be subsequently closed and opened by a continued flow of said mobile material.

23. The combination of an electrically controlled observation apparatus having a visual opening, with a view obstructing device, and a timing mechanism for determining the time interval during which the visual opening is unobstructed, said timing mechanism including a divided container having a transferable mobile material therein, means for permitting the flow of said material from one to another of the said divided portions, a plurality of electrical contacts arranged and adapted to be closed and opened through said mobile material, and a switch for directing an electric current through certain of said contacts.

24. The combination of an electrically controlled observation apparatus having a visual opening, with a view obstructing device, and a timing mechanism for determining the time interval during which the visual opening is unobstructed, said timing mechanism including a container having mobile material therein, means for permitting the movement of said material within the container, a plurality of electrical contacts arranged and adapted to be closed and opened through the said material and its movement within the container, and means including an electrical switch arranged in circuit with the aforesaid contacts for resetting the aforesaid timing mechanism.

25. The combination of an electrically controlled observation apparatus having a visual opening, with a view obstructing device, and a timing mechanism for determining the time interval during which the visual opening is unobstructed, said timing mechanism including a container having a mobile material therein, means for permitting the movement of said material within the container, a plurality of electrical contacts arranged and adapted to be closed and opened through the said material and its movement within the container, and means for permitting the reversing of the flow of said material within the container, said last mentioned means including an electrical switch arranged in circuit with the aforesaid contacts.

26. The combination of an electrically controlled observation apparatus having a visual opening with a view obstructing device, and timing mechanism for determining the time interval during which the visual opening is unobstructed, said timing mechanism including a container having mobile material therein, means for permitting the movement of said material within the container, a plurality of electrical contacts arranged and adapted to be closed and opened through the said material and its movement within the container, means for permitting of the reversing of the flow of said material within the container, an electric switch arranged in circuit with the aforesaid contacts, and another set of contacts provided in said circuit adapted to be closed and opened by said switch.

27. The combination of an electrically controlled observation apparatus having a visual opening, with a view obstructing device, and a timing mechanism for determining the time interval during which the visual opening is unobstructed, said timing mechanism including a container having mobile material therein, means for permitting the movement of said material within the container, a plurality of electrical contacts arranged and adapted to be closed and opened through the said material and its movement within the container, means for permitting of the reversing of the flow of said material in the container, an electric switch arranged in circuit with the aforesaid contacts and movable with the aforesaid reversing means, and auxiliary contacts provided in said circuit adapted to be momentarily closed and immediately opened when the flow of the liquid is reversed.

28. In an electrical observation apparatus having a visual opening, a view obstructing shutter for said opening, an electrically operated timing device for determining the time interval during which the visual opening is unobstructed, means for permitting the rotation of said timing device, a movable switch arranged in the electric circuit with the timing device, and a clutch adapted to be engaged by the insertion of a coin for permitting the simultaneous rotation of the timing device and switch.

29. In an electrical observation apparatus having a visual opening, a view obstructing shutter for said opening, a timing device for determining the time interval during which the visual opening is unobstructed, a shaft for revolubly supporting said timing device, an electric switch movable with said timing device and shaft, and an operating clutch normally disengaged but interconnected and adapted to be engaged by a coin for permitting the simultaneous rotation of the timing device and switch.

30. The combination with an electrically coin controlled observation apparatus having a visual opening, of a view obstructing device, means for opening and closing said view obstructing means, a timing mechanism for determining the time interval during which the visual opening is unobstructed, a coin controlled device for permitting the operation of said timing mechanism, and supplemental means for closing said view obstructing means independent of the first mentioned closing means.

31. An observation apparatus having a visual opening, means for obstructing the view through said opening, a timing device for determining the time interval during which the visual opening is unobstructed, means for positively actuating said view obstructing means, and means for positively maintaining and locking said view obstructing means in either opened or closed position.

32. An electrical observation apparatus having a visual opening, means for obstructing the view through said opening, a timing device for determining the time interval during which the visual opening is unobstructed, means for positively actuating the said view obstructing means, and means for positively maintaining said view obstructing means in either opened or closed position.

33. An electrical observation apparatus having a visual opening, means for obstructing the view through said opening, a timing device for determining the time interval during which the visual opening is unobstructed, coin controlled means for operating such timing device, means for positively actuating the said view obstructing means, and means for positively maintaining said view obstructing means in either opened or closed position.

34. An observation apparatus including a visual tube, a view obstructing device for said tube, actuating means located intermediate the respective lenses of the apparatus and arranged upon the outside of said tube and operatively connected with said view obstructing device for positively opening and closing said view obstructing device, and means for maintaining and locking the view obstructing device in either opened or closed position.

35. An observation apparatus including a visual tube, a view obstructing device for said tube, actuating means located outside of said tube and operatively connected with said view obstructing device, means for positively maintaining and locking the view obstructing device in either opened or closed position, and a timing device for determining the time interval during which the view obstructing device is in opened position.

36. An observation apparatus including a visual tube, a view obstructing device for said tube, actuating means located outside of said tube and operatively connected with said view obstructing device, means for positively maintaining and locking the view obstructing device in either opened or closed position, a timing device for determining the time interval during which the view obstructing device is in opened position, and coin controlled means for operating said timing device.

In testimony whereof we affix our signatures.

DANIEL J. RICHARDSON.
HARRY T. WHEELER.